United States Patent
Hoehne

(10) Patent No.: US 9,411,952 B2
(45) Date of Patent: Aug. 9, 2016

(54) METHOD FOR AUTHENTICATION

(75) Inventor: Matthias Hoehne, Langewahl (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1478 days.

(21) Appl. No.: 12/438,391

(22) PCT Filed: Aug. 7, 2007

(86) PCT No.: PCT/EP2007/058203
§ 371 (c)(1),
(2), (4) Date: May 13, 2009

(87) PCT Pub. No.: WO2008/022917
PCT Pub. Date: Feb. 28, 2008

(65) Prior Publication Data
US 2009/0282252 A1 Nov. 12, 2009

(30) Foreign Application Priority Data
Aug. 22, 2006 (DE) .......................... 10 2006 039 327

(51) Int. Cl.
G06F 21/44 (2013.01)
H04L 9/12 (2006.01)
H04L 9/32 (2006.01)

(52) U.S. Cl.
CPC ...... *G06F 21/44* (2013.01); *H04L 9/12* (2013.01); *H04L 9/3228* (2013.01)

(58) Field of Classification Search
CPC .................................................... G06F 21/44
USPC ...................................... 713/168, 171; 380/44
See application file for complete search history.

(56) References Cited

U.S. PATENT DOCUMENTS 5,349,642 A * 9/1994 Kingdon ............... H04L 63/061
380/28
5,586,260 A * 12/1996 Hu ........................... G06F 21/33
704/272

(Continued)

FOREIGN PATENT DOCUMENTS

EP 0388700 9/1990
JP 2002217884 A 8/2002

(Continued)

OTHER PUBLICATIONS

Mazieres et al.; Separating key management from file system security; Published in: Proceeding SOSP '99 Proceedings of the seventeenth ACM symposium on Operating systems principles; pp. 124-139; ACM New York, NY, USA 1999; ACM Digital Library.*

(Continued)

*Primary Examiner* — Bradley Holder
(74) *Attorney, Agent, or Firm* — Laurence A. Greenberg; Werner H. Stemer; Ralph E. Locher

(57) ABSTRACT

A client is intended to be authenticated with a server. The present disclosure relates to a method that includes using an algorithm for the client and server, but independently of one another, to produce a first key. A second key is produced by the client such that its distance from the first key is within a predetermined distance. The second key is sent to the server. The server successfully authenticates the client if the distance between the received second key and the first key is within the predetermined delta. The second key is used as a new start key for further authentication of the client with the server.

6 Claims, 1 Drawing Sheet

(56) References Cited

U.S. PATENT DOCUMENTS

| | | |
|---|---|---|
| 6,154,541 A | 11/2000 | Zhang |
| RE37,178 E * | 5/2001 | Kingdon ............... H04L 63/061 380/28 |
| 6,292,904 B1 * | 9/2001 | Broomhall ............ G06F 21/335 709/217 |
| 6,633,979 B1 * | 10/2003 | Smeets .......................... 713/151 |
| 7,184,546 B2 * | 2/2007 | Garcia ............................ 380/28 |
| 7,450,720 B2 * | 11/2008 | Roelse .......................... 380/259 |
| 7,653,197 B2 * | 1/2010 | Van Dijk ........................ 380/44 |
| 7,764,789 B2 * | 7/2010 | Goettfert et al. ................ 380/44 |
| 8,050,405 B2 * | 11/2011 | Camp et al. .................... 380/260 |
| 2002/0186840 A1 * | 12/2002 | Rose ............................... 380/37 |
| 2004/0123102 A1 * | 6/2004 | Gehrmann et al. ........... 713/161 |
| 2005/0195975 A1 * | 9/2005 | Kawakita .............. H04L 9/0822 380/30 |
| 2006/0067533 A1 | 3/2006 | Yanovsky |

FOREIGN PATENT DOCUMENTS

| | | |
|---|---|---|
| WO | WO0079457 | 12/2000 |
| WO | 2006003711 A1 | 1/2006 |

OTHER PUBLICATIONS

Mishra et al.; Proactive key distribution using neighbor graphs; Published in: IEEE Wireless Communications (vol. 11, Issue: 1); pp. 26-36; Date of Publication: Feb. 2004; IEEE Xplore.*

* cited by examiner

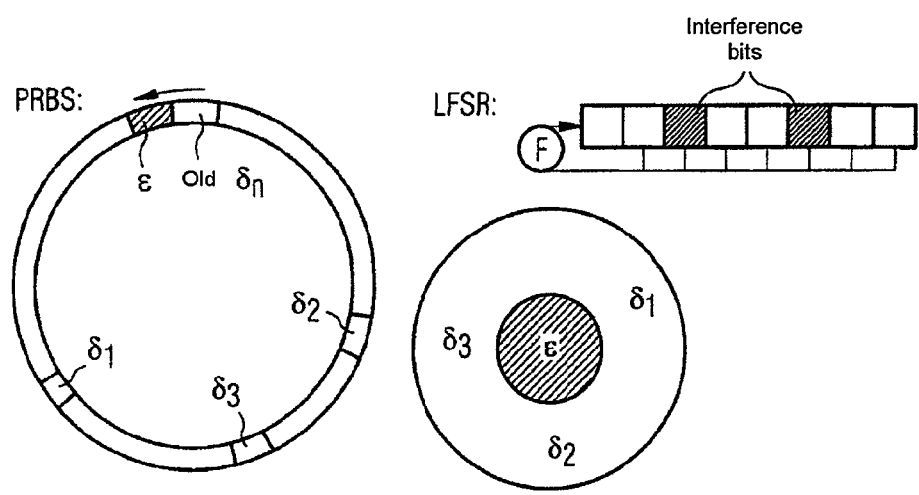

METHOD FOR AUTHENTICATION

PRIORITY CLAIMED

This application is a 371 of International Application No. PCT/EP2007/058203, filed Aug. 7, 2007 and claims the benefit thereof. The International Application claims the benefit of German Application No. 102006039327.9 DE filed Aug. 22, 2006, both of the applications are incorporated by reference herein in their entirety.

TECHNICAL FIELD

A client is intended to be authenticated with a server without transmitting his password in plain text. Even a password which is always encrypted with the same key may be intercepted and used by unauthorized persons.

BACKGROUND

With the conventional method, a random signed challenge text (signed challenge) which is encrypted by the server is requested by the client and is sent. The client decrypts the text, forms a digest and signs and encrypts the latter again (signed digest). The server checks the digests for a match. This method is very complicated.

In a manner similar to a TAN list (One Time Pad), a (finite) list containing keys which should each be used only once could be interchanged in another manner (for example paper) before the first authentication. However, this list would need to be stored or the keys would have to be copied by the user (vulnerable and laborious and prone to error).

SUMMARY

A method for authenticating a client with respect to a server includes generating a first key by the client and server according to an identical algorithm and independently of one another. The algorithm and the starting key of the algorithm were previously determined in a secret agreement between the client and the server. A second key is generated by the client such that the distance between the second key and the first key is within a predefined distance. The predefined distance and the metrics of the keys also were previously determined in a secret agreement between the client and the server. The second key is sent to the server, and the client is authenticated via the server if within the predefined distance. The second key is used as the new starting key for further authentication of the client with respect to the server if the client has been successfully authenticated by the server.

Additional features and advantages are described herein, and will be apparent from the following Detailed Description and the figures

BRIEF DESCRIPTION OF DRAWING

FIG. 1 is a schematic diagram of an example of the method for authenticating a client.

DETAILED DESCRIPTION OF EXEMPLARY EMBODIMENTS

The disclosed method is explained in more detail below with the aid of FIG. 1.

At the outset (as part of a seed), both sides (client and server) agree on the same starting value and the same algorithm for generating keys.

As a result, the client and server are able to generate the same sequence of keys independently of one another. A sequence which can be generated in this manner is also referred to as a PRBS (Pseudo Random Binary Sequence). A PRBS can be generated, for example, with the aid of an LFSR (Linear Feedback Shift Register).

However, PRBS are strictly deterministic. Therefore, the method can be determined after a small number of results (keys) and an attacker then knows all further keys.

In addition, the sequence of keys is repeated exactly after a finite number of keys (period of the LFSR).

However, if interference is inserted into the sequence at regular intervals (that is to say into the formation of the keys with the aid of the LFSR), the result is neither periodic nor deterministic.

The interference in the sequence is achieved as follows (also see FIG. 1).

Initially, the client and server form a first key from the starting value (starting key) with the aid of the LFSR. The first key may be referred to as the epsilon key below for the sake of better differentiation.

The epsilon key is not used for authentication since it is vulnerable.

Next, the client generates a second key and sends it to the server. This second key is used for authentication. In order to understand the formation of the second key, which differs from the formation with the aid of the LFSR, a small digression into metrics is made.

Metrics means the manner in which the distance (delta) between two points is defined. Applied to numbers which are stored by the computer in bits, this means the difference between two numbers in the simplest case. The difference between two binary numbers depends on the significance of the individual bits in the numbers. The significance of the bits is normally determined by their transmission order from 0 ($2^0$) to 31 ($2^{31}$) (old metrics):

```
old metrics: 31........................6543210

2503657302 (10010101001110101100011101010110)
+ 536936480  (00100000000000010000000000100000)
= 3040593782 (10110101001110111100011101110110)

new metrics: 1              0              2
```

According to the old metrics, the distance between the numbers 3040593782 and 2503657302 has the value 536936480. If new metrics are now defined by allocating or agreeing on new significances for different bits, said numbers are at a different distance. If, for example, bit 16 receives the new significance of bit 0 ($2^0$) bit 29 receives the new significance of bit 1 ($2^1$) and bit 5 receives the new significance of bit 2 ($2^2$), the two numbers shown above are only at a distance of 7. The order of the other bits is unimportant for this but not the state (0 or 1) of the bits.

If a delta of up to 7 is considered, according to the new metrics, the number 3040593782 is situated in the delta of 2503657302, but the number 2503657303 is further than 7 away from 2503657302 since one bit which has a higher significance than 2 differs.

In the case of the present disclosure, the client and server agree on the new metrics (as part of the seed) by agreeing on those bits (so-called interference bits) which, unlike their transmission order, have a different significance.

Assuming that 3040593782 is the first key (epsilon key) generated by the client and server, a key whose distance (delta) is within a predefined value with respect to the epsilon key according to the new metrics is then formed by the client as the next key (second key). This key is referred to as the delta key δ below. If the client thus generates the number 478651654 as the next key, it is a delta key since this number is situated in the delta of the epsilon key 3040593782.

Since only the client and server know the new metrics which have been amended according to the position of the interference bits, the server can thus authenticate the client using the second key received. If the second key sent by the client is within the delta, the client is authenticated. This key is used as the new seed on both sides and a further shift in the LFSR becomes the new first key (new epsilon key).

Only 32 bits are shown in the example illustrated above. In reality, the numbers are considerably greater, for example, 2048 or 4096 bits with 8 or 16 interference bits. Other operations can also be used as the difference for determining the distance.

If n is the number of interference bits, all $2^n-1$ delta keys form the delta. The area surrounding the epsilon in the case of known metrics, which delta is again known to both sides by virtue of the position of the interference bits and cannot be determined by the attacker.

An advantage of the disclosure is that a starting key is interchanged once at the outset as part of the seed with the conventional method. Only one key from the new delta then needs to be sent for each new log-on.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method for authenticating a client with respect to a server, the method comprising the steps of:

generating a first key by the client and server according to an identical algorithm and independently of one another, the algorithm and a starting value of the algorithm having been previously determined in an agreement between the client and the server;

generating a second key by the client such that the second key is one of a plurality of keys whose distance to the first key is smaller than a predefined distance, the predefined distance and metrics of the first and second keys having been previously determined in an agreement between the client and the server;

sending the second key to the server;

authenticating the client via the server if the distance between the second key and the first key is smaller than the predefined distance, the distance between the second key and the first key being defined by the metrics determined in the agreement between the client and the server; and using the second key as a new starting key for another authentication of the client with respect to the server if the client has been successfully authenticated by the server.

2. The method as claimed in claim 1, wherein binary numbers are used as the first and second keys.

3. The method as claimed in claim 2, wherein the difference between two binary numbers is used as the distance between two keys.

4. The method as claimed in claim 3, wherein the algorithm is implemented using LFSR (Linear Feedback Shift Register).

5. The method as claimed in claim 2, wherein the algorithm is implemented using an LFSR (Linear Feedback Shift Register).

6. The method as claimed in claim 1, wherein the algorithm is implemented using an LFSR (Linear Feedback Shift Register).

* * * * *